United States Patent [19]

Toivonnen

[11] 4,349,660

[45] Sep. 14, 1982

[54] PROCESS FOR THE PRODUCTION OF AIR DRYING MODIFIED AMINO RESIN

[75] Inventor: Hannu J. Toivonnen, Espoo, Finland

[73] Assignee: Kemira Oy, Helsinki, Finland

[21] Appl. No.: 214,120

[22] Filed: Dec. 8, 1980

Related U.S. Application Data

[63] Continuation-in-part of Ser. No. 959,981, Nov. 13, 1978, abandoned.

[51] Int. Cl.$^3$ .................. C08G 12/30; C08G 12/42
[52] U.S. Cl. .................................. 528/261; 528/258; 528/260; 528/262
[58] Field of Search ............... 528/258, 392, 254, 260, 528/262, 268, 261; 525/518

[56] References Cited

U.S. PATENT DOCUMENTS

2,995,541  8/1961  Kropa et al. ..................... 528/259
3,427,284  2/1969  Bright et al. ..................... 528/259

FOREIGN PATENT DOCUMENTS

1122255  1/1962  Fed. Rep. of Germany .

OTHER PUBLICATIONS

Chem. Abstract, vol. 67, 1967, p. (118180v).

*Primary Examiner*—Theodore E. Pertilla
*Attorney, Agent, or Firm*—Bucknam and Archer

[57] ABSTRACT

A process for the production of an air-drying, modified amino-resin, which process comprises co-polycondensing one or more dialkyl ether compounds, which are dialkyl ether of the dimethylol derivatives of compounds containing two primary amido groups or similar groups, with at least one compound containing an auto-oxidative group, or polycondensing the said one or more dialkyl ether compounds and reacting the compound containing an auto-oxidative group with the condensate; the alcohol released being removed from the mixture. The auto-oxidative groups are typically supplied by allyl ethers and the dialkyl ether compound is e.g. bismethoxymethylene urea. The modified resins rapidly form hard films when exposed to atmospheric oxygen in the presence of drying agents.

8 Claims, No Drawings

PROCESS FOR THE PRODUCTION OF AIR DRYING MODIFIED AMINO RESIN

This application is a Continuation-in-Part of Ser. No. 959,981, filed November 13, 1978, now abandoned.

The present invention relates to a process for the production of air-drying modified amino resins.

It is known that amino resins containing allyl ether groups can be produced by condensing urea together with an aqueous formaldehyde solution and allyl alcohol. Such resins have also been produced by condensing allyl alcohol with preprepared urea-formaldehyde resin (Chem. Abst. 67 (1967) 118180 v). The coating properties of the films formed through oxidation of the produced allyl amino resins have, however, been found to be poor. In the presence of conventional drying agents or catalysts the resins dry very slowly and even then the films formed prove to be very brittle.

In the German lay-open print No. 1,222,255 there has been disclosed a general method for the preparation of air-drying modified amino-triazineformaldehyde resin by using aminotriazine containing at least two amino groups, the methylol groups of which can be etherified e.g. by methanol. In Example 10 of this publication tetramethylolbenzoguanamine has been used, in which both hydrogen atoms have been replaced by methylol groups. A compound of this kind, however, cross-links relatively easily, for which reason an excess of alcohol must be used so as to prevent it from gelling.

The object of the present invention is to reduce the need of the class of compound containing the auto-oxidative group in the preparation of the air-drying modified amino resin. The compound containing the auto-oxidative group is the most expensive component of the resin and for this reason it is important to reduce its portion in the resin as small as possible.

SUMMARY OF THE INVENTION

It has now surprisingly been found that by polycondensing the dialkylether of the dimethylol derivative of a compound containing two primary amido groups or similar groups to long chains, which have a high polymerization degree, it is needed correspondingly less of the component containing allyl ether groups. The expensive component containing allyl ether groups is thus not used for the increase of the polymerization degree of the resin as before but only for the cross-linking of the obtained long chains, to which purpose it is needed much less of the component containing allyl ether.

The present invention is based on the perception that inside the broad field presented in the German lay-open print, No. 1,122,255 there is a special class of compounds, with which it is possible to produce a much better air-drying modified amino-resin by using less of the compound containing the auto-oxidative group, such as the monoallylether of the alcohols. By the method according to the invention the compound is produced with a much smaller amount of the monoallylether of ethyleneglycol an air-drying resin, which possesses much better properties than the resins disclosed in the German lay-open print No. 1,122,255.

DESCRIPTION OF THE PREFERRED EMBODIMENTS

The present invention now provides a process for the production of an air-drying, modified amino-resin, which process comprises co-polycondensing one or more dialkyl compounds, which are dialkyl ethers of the dimethylol derivatives of compounds containing two primary amido groups or resembling groups, with at least one compound containing an auto-oxidative group, or polycondensing the said one or more dialkyl ether compounds and reacting the compound containing an auto-oxidative group with the condensate; the alcohol released being removed from the mixture.

The invention includes resins so produced and products made from them, e.g. coated substrates.

The resins hereinafter described in the Examples rapidly form hard films under the effect of atmospheric oxygen.

Any groups the presence of which in compounds makes them usable raw materials for the production of conventional amino resins, for example in the sense described in Vale, C. P., Taylor, W. G. K., Aminoplastics, London, 1964, p. 8–15, can be regarded as groups resembling the amido groups.

Especially advantageous groups resembling the amido groups are the following:

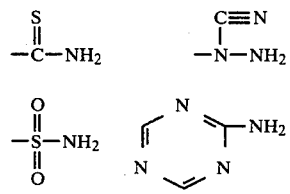

Groups resembling allyl ether groups denote all groups which, on the basis of auto-oxidation under the effect of atmospheric oxygen, are capable of cross-linking polymers which contain these groups in their molecules. Groups behaving in the said way have been discussed in more detail in, for example, Jenkins, V. F., Mott, A., Wicker, R. J., J.O.C.C.A., 1961, January, p. 42.

In the production of polymers it is also possible, if desired for the purpose of modification, to add to the mixture to be polycondensed one or more compounds belonging to the above groups, i.e. compounds which contain some groups which affect the properties of the polymer in the desired manner.

The improved film-forming ability of the air-drying amino resins produced by the process according to the invention, as compared with previously described allylic amino resins, is most likely due to the fact that the average functionality of the polymerization system is smaller when the formaldehyde and the amido component are brought into the reaction mixture in the form of an etherified methyl derivative than when it is brought in the form of a free amide and formaldehyde. Thereby a higher degree of conversion can be achieved for the polymerization reactions before the gelling of the reaction mixture.

Achieving a greater conversion also means a higher functionality of the polymer with respect to allyl ether groups owing to the higher molecular weight obtained and possibly also to a more complete reaction of the reagent containing allyl ether groups, and the air-drying of the polymer containing allyl ether groups, based on oxidation, is known to occur at a more rapid rate when the average number of the allyl ether groups present in the polymer molecules is higher.

An amide component dimethylolated with formaldehyde, dietherified and suitable for use as raw material can be any compound containing two primary amide groups or a compound behaving chemically in a similar manner, such as urea, thiourea, dicyandiamide, oxamide or some other acid amide or amino triazine, such as guanamines. In terms of the structure of the amide it is important that it contains only primary amido groups or comparable groups, and the bifunctionality of the compounds in question with respect to these groups is also essential in terms of the invention. If the compound contains more than two amido groups, the average functionality of the mixture to be polymerized rises too much, whereby the gelling conversion decreases; on the other hand, the amido group is not sufficient for the reactions leading to polymerization and to modification by allyl ether groups.

Any alcohol can be used for the etherification of the dimethyl derivative of the amido component, as long as its volitility is sufficient, under the polymerization conditions used, for the alcohol released in the equilibrium reactions to be removable from the mixture to be polymerized. The alcohols best suited for etherification are alcohols with low boiling points, such as methanol, ethanol ad propanols. The type of alcohol used for the etherification affects not only the progress of the polymerization but also the quality of the polymer produced, for part of the alcohol naturally remains in the backbone of the polymer and thereby affects its properties. The diether of the dimethylol compound in the amido component can be produced by separately known methods from amine, formaldehyde and the alcohol selected for the etherification, or it can be prepared before the actual polymerization directly in the polymerization reactor by etherifying the dimethylol derivative of the amide by known methods.

According to the invention, the component containing allyl ether groups and necessary for the production of polymers is preferably a compound having the general formula:

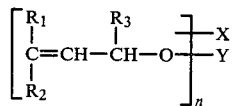

where n can be one or an integer greater than one. $R_1$, $R_2$ and $R_3$ are hydrogens or alkyls so that the radicals linked to different allyl ether groups or a particular allyl ether group are not necessarily mutually alike. Y is an organic radical, which can be an alkyl or a heterocycle. X is a group with the aid of which the allyl ether component is capable of being attached to the backbone of the polymer being formed, but as regards the polymerization reactions it is by nature such that the component does not cause cross-linking in the system. Applicable groups include, for example, those of the type —ZH, where Z is oxygen, sulfur or nitrogen so that the group is capable of reacting with the etherified methylol present in the polymer only as a monovalent functional group. Typical examples of such groups containing an active hydrogen atom include alcoholic, acetalic and phenolic —OH, thiolic or thiophenolic —SH, and the amino and amido groups. Other groupings usable in the place of X include those containing the following groups:

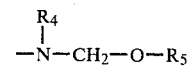

where $R_4$ and $R_5$ are alkyls. The allyl ether component may also contain two groups capable of reaction with active hydrogen atoms, for in practice it has been observed to react obviously only with the amido protons at the ends of the polymer chains, since when reagents bifunctional with respect to the said groups are added, gelling does not occur even within a long polymerization period. The reason for the different behavior of the amido protons in the polymer chain itself may be their sterically protected position. Examples of usable allyl ether components include the groups containing these groups, such as the diallyl ethers of triethylol-ethane and propane and glycerol, the triallyl ether of pentaerythritol, the polyallyl ethers of sugar alcohols, and the monoallyl ethers of ethene- and propenediols. In principle, allyl alcohol is also a usable raw material, but its use is limited and greatly complicated by the small amount of free allyl alcohol, which is always present in the resin produced and which causes irritation and is toxic. The compound containing allyl ether groups can also be replaced by reagents which contain some groups which resemble allyl ether groups in the manner described previously. Examples of such groups include the autooxidative groups present in various drying oils and the crotyloxy, metallyloxy and benzyloxy groups.

The components used for controlling the properties of the polymer may also be various compounds resembling the amide components or allyl ether components defined above, with which the desired effect, such as internal softening or an appropriate solubility, is achieved. In this case, if a compound resembling allyl ether components is used, it does not necessarily have to contain allyl ether groups.

The polymers of the invention are preferably produced by polycondensing raw materials at a temperature at which the mixture is in the molten stage but no thermal decomposition of the polymer produced occurs. The polymerization can be performed under normal pressure or a vacuum and, if so desired, in the presence of a suitable catalyst. Suitable catalysts include organic and inorganic acids and bases. The polymerization is continued until the reaction mixture has converted to a viscous, resinous material. The polymers can be produced either by polycondensing all the raw materials used for the polymer production similtaneously until the desired product is obtained or by polycondensing first the diether of the dimethylol compound of the amido component alone or together with only some other components used for the production to form a precondensate of the desired type, by adding the rest of the components only at this stage, and by then completing the polycondensation.

The invention is described below with the aid of examples.

EXAMPLE 1

One mole of bismethoxymethylene urea and 0.4 mole of trimethylolpropanediallyl ether were placed in a reaction vessel fitted with a two-blade mixer. The mixture was heated to 100° C., and after melting had taken place, 0.23 g of maleic acid was added into the vessel. Immediately after the addition of maleic acid the mixture began to foam and methanol distilled out of the reaction vessel. To facilitate the distillation, the mixture was agitated at 100 r/min, and nitrogen was injected into the reaction vessel at 0.3 l/min. The polymerization was discontinued after 5 h, at which time the product was a viscous liquid at the polymerization temperature and a solid, colorless and nearly odorless resin, readily soluble in, for example, ethanol, at room temperature.

When cobalt as naphthenate was used as drying agent at 0.1% of the weight of the polymer, the film drawn from the ethanol solution of the polymer dried in 1.8 h, as measured by adherence of sand. The Koenig hardness of the film developed after drying as follows:

| Age of film | Koenig/s |
|---|---|
| 1 d | 42 |
| 7 d | 84 |
| 14 d | 108 |

EXAMPLE 2

The raw materials used for the polymer were bisethoxymethylene urea and trimethylolpropanediallyl ether. The quantities and polymerization were the same as in Example 1. When the polymer was tested in the manner described in Example 1, the following results were obtained:

| | Drying time 3.5 h |
|---|---|
| Age of film | Koenig/s |
| 1 d | 48 |
| 7 d | 97 |
| 14 d | 158 |

EXAMPLE 3

One mole of bismethoxymethylene benzoguanamine and 0.4 mole of trimethylolpropanediallyl ether were heated in a reaction vessel to 150° C. After the mixture had melted methanol began to distill immediately out of the reaction vessel without the addition of a catalyst. The polymerization was continued for 4 h while agitating the mixture and injecting nitrogen into the reaction vessel. A polymer was prepared analogously by using bismethoxymethylene acetoguanamine as the amido component. The following properties were measured from the polymer lacquer films in the manner described in Example 1:

| | | Koenig hardness/s | | |
|---|---|---|---|---|
| Amido component | Drying time | 1 d | 7 d | 14 d |
| benzoguanamine | 3 h | 70 | 127 | 172 |
| acetoguanamine | 3 h | — | — | 140 |

EXAMPLE 4

A polymer was prepared and tested in the manner described in Example 1, using as raw materials bismethoxymethylene urea and diallyl ether of glycerol. The drying time measured was 7.5 h and the Koenig hardness 46 s (1 d), 143 s (7 d) and 145 s (14 d).

EXAMPLE 5

A polymer was prepared and tested by the procedure of Example 1, using as its raw materials 1 mole of bismethoxymethylene urea and 0.8 mole of monoallyl ether of propylene glycol. The drying time was 2 h and the Koenig hardness: 47 s (1 d), 134 s (7 d), 170 s (14 d).

EXAMPLE 6

0.65 mole of bismethoxymethylene urea and 5.2 moles of allyl alcohol were weighted into a reaction vessel fitted with a mixer and a 15 cm-long Vigreux column. The mixture was heated to 95° C., and 0.1 g of maleic acid was added as a catalyst. A mixture of methanol and allyl alcohol was distilled out of the mixture within the temperature range 88° C.–95° C. for approx. 3 h, whereafter the polymerization was discontinued. The polymer was a slightly cloudy solid material with a strong odor of allyl alcohol.

When tested according to Examples 1, 2.5 h was observed as the drying time of the polymer, and its Koenig hardness developed as follows: 44 (1 d), 89 (7 d), 117 (14 d).

EXAMPLE 7

In addition to bismethoxymethylene urea (BMMU) and trimethylolpropenediallyl ether (TMPDA), bismethoxymethyleneethylene urea (BMME) as an example of compounds containing alcoxymethylene groups, monoethyl ether of diethylene glycol (DEGME) as an example of compounds containing an active hydrogen atom, and caprolactam (CL) were used as modifying monomers in the reaction mixtures in order to soften the polymers. The modification was also carried out by replacing part of the bismethoxymethylene urea with another amido component, i.e., bismethoxymethylene adipamide (BMMA). The polymers were prepared and tested as in Example 1. In addition, a bending test using a device described in standard SIS 184 174 was performed on week-old films made on aluminum sheets. The bending test gives a picture of the elastic properties of the lacquer film: the smaller the reported numerical value, the tougher the film. The properties tested as regards the polymers are compiled in the table below. For the sake of comparison, the table also includes the test results of an unmodified polymer.

| Raw materials of resins | | | Test Results | | |
|---|---|---|---|---|---|
| BMMU/ mol | TMPDA/ mol | Modifying Agent/mol | Drying time/h | Koenig hardness/s at 14 d | Bending Test/mm |
| 1 | 0.4 | — | 7 | 74 | 32 |
| 0.8 | 0.4 | BMME/0.2 | 8 | 41 | 16 |
| 1 | 0.4 | DEGME/0.2 | 5.5 | 73 | 8 |
| 1 | 0.4 | CL/0.2 | 7 | 38 | 20 |
| 0.8 | 0.4 | BMMA/0.2 | 3.5 | 34 | 8 |

EXAMPLE 8

A resin was prepared by the procedure of Example 1 by using 1 mole of bismethoxymethylenethiourea, 0.7 mole of trimethylolpropanedialkylether, and 0.33 g maleic acid as raw material. The resin was dissolved in the 1/1-mixture of butyloxytol and ethanol to a solution, the drying time of which was tested as described in Example 1. A drying time of 56.5 hours was measured.

EXAMPLE 9

1 mole of bismethoxymethylenedicyandiamide, 0.2 mole of trimethylolpropanediallylether and 0.2 mole of the monoethyleneether of diethyleneglycol was melted to a homogeneous solution at a temperature of 142° C.

To the solution was added, for initiating of the polymerization, 0.24 g of maleic acid and the polycondensation was continued as described in Example 1 for one hour. The reaction mixture obtained was dissolved in dimethyl acetamide to a solution of 52 weight-%, which after drying as described in Example 1 formed, when it dried, a film in 8.5 hours.

EXAMPLE 10

102.4 g of the dimethylether of trimethylol benzoguanamine and 15.1 g of the monoallylether of ethyleneglycol was melted at a temperature of 150° C. To the mixture was added 0.13 parts of maleic acid and the polycondensation was continued for one hour. When testing the film forming properties of the obtained product as described in Example 1 the following results are received:

Drying time=3 h and Koenig-hardness=136 (1 d), 165 (8 d).

What is claimed is:

1. A process for the production of an air-drying, modified amino-resin, which process consists of (a) co-polycondensing at least one dialkyl ether compound, which is a dialkyl ether of the dimethylol derivative of a compound containing two primary amino groups or two groups behaving as two disubstituted primary amino groups, with at least one compound containing an auto-oxidative group, or (b) polycondensing said dialkyl ether compound and reacting the compound containing an auto-oxidative group with the condensate; said compound containing said auto-oxidative group being a compound containing at least one allyl ether group, said compound having the general formula:

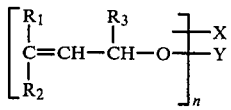

wherein n is 1 or an integer greater than 1; $R_1$, $R_2$ and $R_3$ are hydrogens or alkyls, the terminal group Y is an alkyl or heterocyclic radical and the group X is capable of becoming attached to the backbone of the polymer being formed, said group X being incapable of causing cross-linking, or said group X being —ZH in which Z is O, S or N and H is an active hydrogen atom, or said compound containing said auto-oxidative group contains two groups capable of reacting with active hydrogen atoms, and removing the released alcohol from the mixture.

2. The process of claim 1, wherein the dialkyl ether compound is a bisalkoxymethylene urea compound or a bisalkoxymethylene derivative of triazine containing two amino groups.

3. The process of claim 2, wherein the bisalkoxymethylene urea compound is bismethoxy or bisethoxymethylene urea and the bisalkoxymethylene derivative of a triazine compound is bismethoxymethylene benzoguanamine or bismethoxymethylene acetoguanamine.

4. The process of claim 1, wherein the compound containing an auto-oxidative group is a member selected from the group, consisting of trimethylolpropanediallyl ether, the diallylether of trimethylolethane and glycerol, the triallylether of pentaerythritol, a polyallyl ether of a sugar alcohol, the monoallyl ether of ethylenediol and the monoallyl ether of propylenediol.

5. The process of claim 1, wherein the reaction is carried out at the boiling point of the alcohol released in the reaction.

6. The process of claim 1, wherein the reaction is catalyzed with an acid or a base.

7. The process of claim 6, wherein the acid is maleic acid.

8. The process of claim 1, wherein the amino resin is further modified by adding to the reaction mixture at least one compound which is a member selected from the group, consisting of bismethoxymethylene urea, bismethoxyethylene adipamide, monoethyl ether of diethylene glycol, and caprolactam.

* * * * *